United States Patent [19]

Zani

[11] 4,190,039
[45] *  Feb. 26, 1980

[54] SOLAR ENERGY LIQUID HEATING DEVICE

[76] Inventor: David A. Zani, P.O. Box 165, Kingshill, St. Croix, V.I. 00850

[*] Notice: The portion of the term of this patent subsequent to Mar. 14, 1995, has been disclaimed.

[21] Appl. No.: 896,997

[22] Filed: Apr. 17, 1978

[51] Int. Cl.² .................................................. F24J 3/02
[52] U.S. Cl. .................................................. 126/450
[58] Field of Search ................ 126/270, 271; 237/1 A

[56] References Cited

U.S. PATENT DOCUMENTS

| | | | |
|---|---|---|---|
| 3,866,285 | 2/1975 | Clark | 126/271 X |
| 4,010,733 | 3/1977 | Moore | 126/271 |
| 4,078,546 | 3/1978 | Zani | 126/271 |
| 4,089,324 | 5/1978 | Tjaden | 126/271 |

Primary Examiner—Samuel Scott
Assistant Examiner—Lee E. Barrett

[57] ABSTRACT

A solar energy liquid heating device comprising a collector plate. A wall member is attached to the periphery of the collector plate and to the periphery of a panel to form an enclosure. The central portion of the panel is transparent and transmits solar energy therethrough and into the enclosure. Liquid is passed through an aperture in the wall member. The outside of the enclosure is insulated with polyurethane foam that is applied by spraying process. The outside surface of the polyurethane foam is covered with an elastomeric membrane.

3 Claims, 2 Drawing Figures

SOLAR ENERGY LIQUID HEATING DEVICE

BACKGROUND OF THE INVENTION

The invention relates to a solar energy liquid heating device and a method of insulating said device.

Insulated solar energy liquid heating devices are known in the prior art but it is believed that none describes a method for applying insulation that comprises a spraying process followed by applying an elastomeric membrane to the outside surfaces of the insulation.

In U.S. Pat. No. 4,078,546 to ZANI, a method of manufacturing and insulating a solar energy collecting device is disclosed to heat a fluid.

The solar energy liquid heating device disclosed herewith uses the same method of insulation as disclosed in U.S. Pat. No. 4,078,546 to ZANI.

SUMMARY OF THE INVENTION

It is the principal object of this invention to provide a solar energy liquid heating device and a method of insulating the device.

It is a further object of this invention to provide a method for insulating the device after it has been mounted for use.

A still further object of this invention is to provide a method of repairing damaged insulation of an existing solar energy liquid heating device.

A still further object of this invention is to provide a sealant to make an air and watertight covering over the insulation.

These and other embodiments are achieved by the preferred embodiment of the present invention comprises the method of spraying a polyurethane foam insulation over a solar energy liquid heating device and applying an elastomeric membrane to the outside surface of the insulation.

Having in mind the above and other objects that will be obvious from an understanding of the disclosure, the present invention comprises an apparatus and method which are hereinafter set forth in sufficient detail to enable those persons skilled in the art to clearly understand the function, operation, construction and advantages of it when read in conjunction with the accompanying drawing.

BRIEF DESCRIPTION OF THE DRAWING

The invention will be described in detail, by way of example, with reference to the accompanying drawings in which.

DETAILED DESCRIPTION OF THE INVENTION

Figure 1:
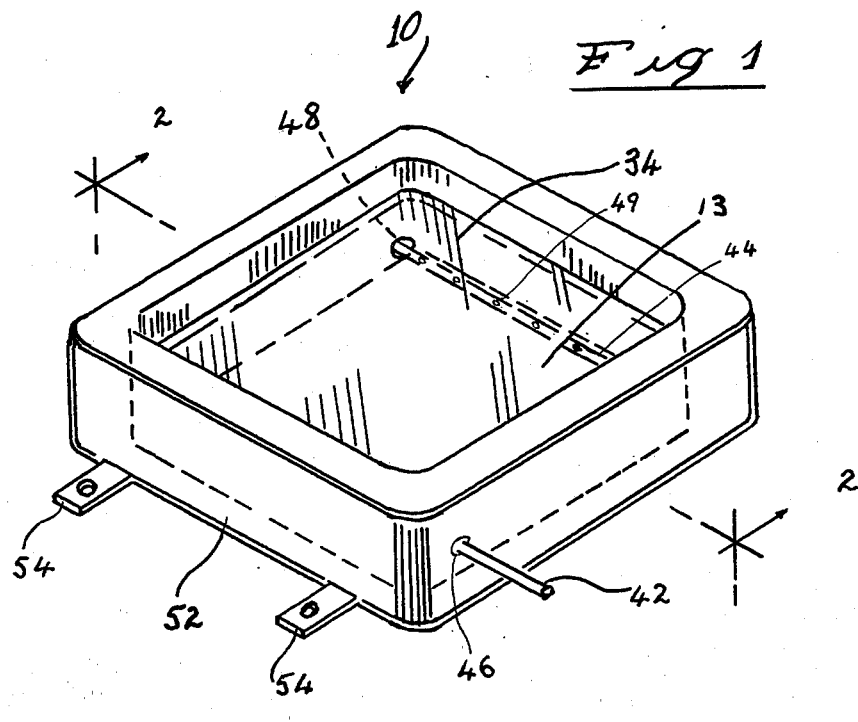
FIG. 1 is a perspective view of the preferred embodiment.
Figure 2:
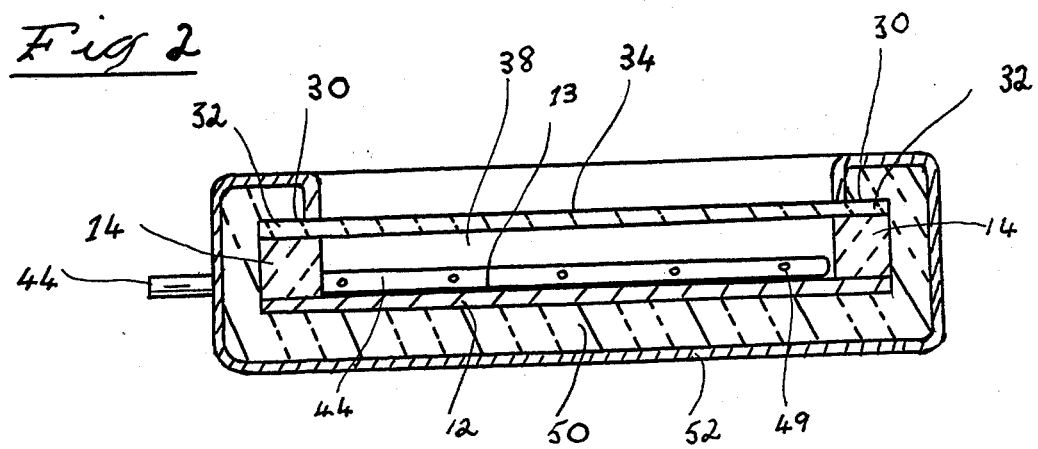
FIG. 2 is a sectional view taken along lines 2—2 in FIG. 1.

Referring to FIGS. 1 and 2 of the drawing and accordance with the principles of this invention, a solar energy liquid heating device 10 is shown comprising a collector plate 12, having a black heat absorbing surface 13 and a wall member 14.

The wall member 14 is interposed between the collector plate 12 and the periphery portion 30 of panel 32 to form an enclosure 38. The panel 32 generally comprises glass, clear acrylic plastic or other transparent material capable of transmitting solar energy but only the central portion 34 within the periphery 30 need have this property.

Although the collector plate 12 is illustrated as a flat plate, many other shapes such as a corrugated section, a ribbed section, not shown may be advantageous for collecting solar energy. These shapes of collector plates will not preclude the use of the apparatus and method herein disclosed. Similarly, more than one panel may be used to reduce heat loss through this area provided each has a solar energy transmitting central portion.

Liquid is passed through inlet and outlet tube portion 44 and 42 the project through the wall member 14 at apertures 48 and 46. The liquid flows from the holes 49 in tube portion 44 on to the heat-absorbing surface 13 and the liquid exits at the outlet tube portion 42. Liquid passed through the enclosure 38 will be heated by the transfer of energy that was absorbed by the heat-absorbing surface 13.

To reduce heat losses and increase the efficiency of the device 10, all outside surfaces of the enclosure 38 must be insulated except, of course, for the energy transmitting portion 34 of the panel 32. The insulation 50 is an air-cured polyurethane foam applied by a spraying process. The foam may be formulated by heating a polymeric isocyanate reagent and a polyol resin reagent in separate vessels and the blowing of the heated mixture through the nozzle of a spray gun using "Freon 12" blowing agent.

To protect the insulation 50 from deterioration by weather or sunlight and to make its surface air and water tight a sealant 52 may be applied over the insulation. The sealant may comprise an elastomeric membrane such as rubber which will stretch with the variations in temperature and is opaque to ultraviolet radiation.

The insulation 50 air cures to form a rigid structure which holds together the transparent panel, wall member and collector plate without requiring nuts, bolts or clamps.

The insulation 50 may be applied over mounted device 10 since no molds or frames are required to confine the foam. The method may also be used to repair damaged insulation.

Mounting brackets 54, attached to the collector plate 12, are used for installing the device 10.

While preferred methods, devices and other exemplary embodiments of the invention are illustrated and/or described, it will be understood that the invention is in no way limited to these embodiments.

What is claimed is:

1. A solar energy liquid heating device comprising:
   a. a collector plate;
   b. a wall member extending perpendicular from the plane of the collector plate;
   c. a panel having a peripheral portion bearing against a wall member to form an enclosure, said panel having a transparent central portion capable of transmitting solar energy therethrough;
   d. a heat absorbing surface within the enclosure, the wall member of the enclosure having apertures whereby liquid can be passed therethrough during use to extract solar energy absorbed in the enclosure; and
   e. insulation covering the outside of the enclosure excepting said transparent central portion of the panel to form a rigid structure to enclose the transparent panel, wall member and collector plate,
   f. an elastomeric membrane covering the outside of the insulation.

2. The device according to claim 1, wherein said insulation comprises polyurethane foam.

3. The device according to claim 2, wherein said polyurethane foam comprises a polymeric isocyanate reagent and a polyol resin reagent.

* * * * *